United States Patent
Crabtree et al.

(10) Patent No.: US 11,831,682 B2
(45) Date of Patent: Nov. 28, 2023

(54) HIGHLY SCALABLE DISTRIBUTED CONNECTION INTERFACE FOR DATA CAPTURE FROM MULTIPLE NETWORK SERVICE AND CLOUD-BASED SOURCES

(71) Applicant: QOMPLX, Inc., Tysons, VA (US)

(72) Inventors: Jason Crabtree, Vienna, VA (US);
Angadbir Salaria, Herndon, VA (US);
Andrew Sellers, Monument, CO (US);
Marian Trnkus, Chevy Chase, MD (US)

(73) Assignee: QOMPLX LLC, New York, NY (US)

( * ) Notice: Subject to any disclaimer, the term of this patent is extended or adjusted under 35 U.S.C. 154(b) by 614 days.

(21) Appl. No.: 17/074,882

(22) Filed: Oct. 20, 2020

(65) Prior Publication Data
US 2021/0160288 A1    May 27, 2021

Related U.S. Application Data

(63) Continuation-in-part of application No. 17/035,029, filed on Sep. 28, 2020, now Pat. No. 11,546,380, which is a continuation-in-part of application No. 17/008,276, filed on Aug. 31, 2020, now Pat. No. 11,323,484, which is a continuation-in-part of
(Continued)

(51) Int. Cl.
*H04L 9/40* (2022.01)
*G06F 16/2458* (2019.01)
*G06F 16/951* (2019.01)

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1425; H04L 63/1441; G06F 16/2477; G06F 16/951
See application file for complete search history.

(56) References Cited

U.S. PATENT DOCUMENTS 7,818,224 B2    10/2010  Boerner
7,818,417 B2    10/2010  Ginis et al.
(Continued)

OTHER PUBLICATIONS

Eder J, Liebhart W. "Workflow recovery". In Proceedings First IFCIS International Conference on Cooperative Information Systems Jun. 1, 19969 (pp. 124-134). IEEE. (Year: 1996).*

*Primary Examiner* — Catherine Thiaw
(74) *Attorney, Agent, or Firm* — Galvin Patent Law LLC; Brian R. Galvin; Brian S. Boon

(57) ABSTRACT

A system and method for a highly scalable distributed connection interface for data capture from multiple network service sources. The connection interface is designed to enable simple to initiate, performant and highly available input/output from a large plurality of external networked service's and application's application programming interfaces (API) to the modules of an integrated predictive business operating system. To handle the high volume of information exchange, the connection interface is distributed and designed to be scalable and self-load-balancing. The connection interface possesses robust expressive scripting
(Continued)

capabilities that allow highly specific handling rules to be generated for the routing, transformation, and output of data within the business operating system.

10 Claims, 11 Drawing Sheets

Related U.S. Application Data application No. 17/000,504, filed on Aug. 24, 2020, now Pat. No. 11,477,245, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, and a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, said application No. 16/836,717 is a continuation-in-part of application No. 15/887,496, filed on Feb. 2, 2018, now Pat. No. 10,783,241, said application No. 16/248,133 is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, and a continuation-in-part of application No. 15/835,312, filed on Dec. 7, 2017, now Pat. No. 11,055,451, said application No. 16/720,383 is a continuation of application No. 15/823,363, filed on Nov. 27, 2017, now Pat. No. 10,560,483, said application No. 15/887,496 is a continuation of application No. 15/823,363, which is a continuation-in-part of application No. 15/823,285, filed on Nov. 27, 2017, now Pat. No. 10,740,096, and a continuation-in-part of application No. 15/818,733, filed on Nov. 20, 2017, now Pat. No. 10,673,887, said application No. 16/248,133 is a continuation-in-part of application No. 15/806,697, filed on Nov. 8, 2017, now abandoned, and a continuation-in-part of application No. 15/806,697, filed on Nov. 8, 2017, now abandoned, said application No. 15/835,436 is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, said application No. 15/823,285 is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, said application No. 15/818,733 is a continuation-in-part of application No. 15/725,274, filed on Oct. 4, 2017, now Pat. No. 10,609,079, said application No. 15/823,363 is a continuation-in-part of application No. 15/725,274, filed on Oct. 4, 2017, now Pat. No. 10,609,079, said application No. 16/248,133 is a continuation-in-part of application No. 15/673,368, filed on Aug. 9, 2017, now abandoned, said application No. 15/725,274 is a continuation-in-part of application No. 15/655,113, filed on Jul. 20, 2017, now Pat. No. 10,735,456, said application No. 15/813,097 is a continuation-in-part of application No. 15/616,427, filed on Jun. 7, 2017, now abandoned, said application No. 15/655,113 is a continuation-in-part of application No. 15/616,427, filed on Jun. 7, 2017, now abandoned, which is a continuation-in-part of application No. 15/616,427, filed on Jun. 7, 2017, now abandoned, said application No. 15/787,601 is a continuation-in-part of application No. 15/616,427, filed on Jun. 7, 2017, now abandoned, which is a continuation-in-part of application No. 15/790,327, said application No. 15/673,368 is a continuation-in-part of application No. 15/376,657, filed on Dec. 13, 2016, now Pat. No. 10,402,906, which is a continuation-in-part of application No. 15/376,657, filed on Dec. 13, 2016, now Pat. No. 10,402,906, which is a continuation-in-part of application No. 15/806,697, and a continuation-in-part of application No. 15/343,209, filed on Nov. 4, 2016, now Pat. No. 11,087,403, said application No. 15/376,657 is a continuation-in-part of application No. 15/237,625, filed on Aug. 15, 2016, now Pat. No. 10,248,910, said application No. 15/655,113 is a continuation-in-part of application No. 15/237,625, filed on Aug. 15, 2016, now Pat. No. 10,248,910, said application No. 15/343,209 is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, said application No. 15/237,625 is a continuation-in-part of application No. 15/206,195, filed on Jul. 8, 2016, now abandoned, said application No. 15/229,476 is a continuation-in-part of application No. 15/206,195, filed on Jul. 8, 2016, now abandoned, which is a continuation-in-part of application No. 15/186,453, filed on Jun. 18, 2016, now abandoned, said application No. 15/835,312 is a continuation-in-part of application No. 15/186,453, filed on Jun. 18, 2016, now abandoned, which is a continuation-in-part of application No. 15/166,158, filed on May 26, 2016, now abandoned, said application No. 15/790,327 is a continuation-in-part of application No. 15/141,752, filed on Apr. 28, 2016, now Pat. No. 10,860,962, said application No. 15/166,158 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, which is a continuation-in-part of application No. 15/141,752, and a continuation-in-part of application No. 14/986,536, filed on Dec. 31, 2015, now Pat. No. 10,210,255, said application No. 15/616,427 is a continuation-in-part of application No. 14/925,974, filed on Oct. 28, 2015, now abandoned, which is a continuation-in-part of application No. 14/925,974, filed on Oct. 28, 2015, now abandoned.

(60) Provisional application No. 62/568,298, filed on Oct. 4, 2017, provisional application No. 62/568,312, filed on Oct. 4, 2017, provisional application No.

62/568,305, filed on Oct. 4, 2017, provisional application No. 62/568,291, filed on Oct. 4, 2017, provisional application No. 62/568,307, filed on Oct. 4, 2017.

(56) References Cited

U.S. PATENT DOCUMENTS

| | | |
|---|---|---|
| 7,840,677 B2 | 11/2010 | Li et al. |
| 8,069,190 B2 | 11/2011 | Mccoll et al. |
| 8,180,854 B2 * | 5/2012 | Schneider ............... H04L 63/20 709/218 |
| 9,338,061 B2 | 5/2016 | Chen et al. |
| 9,639,575 B2 | 5/2017 | Eida et al. |
| 10,168,691 B2 | 1/2019 | Zornio et al. |
| 10,740,358 B2 | 8/2020 | Chan et al. |
| 11,093,476 B1 * | 8/2021 | Neeman ............... H04L 43/045 |
| 2010/0150329 A1 * | 6/2010 | Kumar ................. G06Q 10/08 379/201.12 |
| 2013/0290554 A1 | 10/2013 | Chen et al. |
| 2016/0092557 A1 | 3/2016 | Stojanovic et al. |
| 2016/0308714 A1 * | 10/2016 | Mueller ................. G06F 9/546 |
| 2017/0006135 A1 | 1/2017 | Siebel et al. |
| 2017/0090893 A1 | 3/2017 | Aditya et al. |
| 2019/0363990 A1 * | 11/2019 | Lorenz ............... H04L 47/2483 |
| 2020/0351163 A1 * | 11/2020 | Tabak ............... G06Q 30/0603 |

* cited by examiner

HIGHLY SCALABLE DISTRIBUTED CONNECTION INTERFACE FOR DATA CAPTURE FROM MULTIPLE NETWORK SERVICE AND CLOUD-BASED SOURCES

CROSS-REFERENCE TO RELATED APPLICATIONS

| application Ser. No. | Date Filed | Title |
| --- | --- | --- |
| Current application | Herewith | HIGHLY SCALABLE DISTRIBUTED CONNECTION INTERFACE FOR DATA CAPTURE FROM MULTIPLE NETWORK SERVICE AND CLOUD-BASED SOURCES |
| | | Is a continuation-in-part of: |
| 17/035,029 | Sep. 28, 2020 | SYSTEM AND METHOD FOR CREATION AND IMPLEMENTATION OF DATA PROCESSING WORKFLOWS USING A DISTRIBUTED COMPUTATIONAL GRAPH |
| | | which is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/855,724 | Apr. 22, 2020 | ADVANCED CYBERSECURITY THREAT MITIGATION USING SOFTWARE SUPPLY CHAIN ANALYSIS |
| | | which is a continuation-in-part of: |
| 16/836,717 | Mar. 31, 2020 | HOLISTIC COMPUTER SYSTEM CYBERSECURITY EVALUATION AND SCORING |
| | | which is a continuation-in-part of: |
| 15/887,496 U.S Pat. No. 10,783,241 | Feb. 2, 2018 Issue Date Sep. 22, 2020 | SYSTEM AND METHODS FOR SANDBOXED MALWARE ANALYSIS AND AUTOMATED PATCH DEVELOPMENT, DEPLOYMENT AND VALIDATION |
| | | which is a continuation-in-part of: |
| 15/818,733 U.S Pat. No. 10,673,887 | Nov. 20, 2017 Issue Date Jun. 2, 2020 | SYSTEM AND METHOD FOR CYBERSECURITY ANALYSIS AND SCORE GENERATION FOR INSURANCE PURPOSES |
| | | which is a continuation-in-part of: |
| 15/725,274 U.S Pat. No. 10,609,079 | Oct. 4, 2017 Issue Date Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT |
| | | which is a continuation-in-part of: |
| 15/655,113 U.S Pat. No. 10,735,456 | Jul. 20, 2017 Issue Date Aug. 4, 2020 | ADVANCED CYBERSECURITY THREAT MITIGATION USING BEHAVIORAL AND DEEP ANALYTICS |
| | | which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | and is also a continuation-in-part of: |
| 15/237,625 U.S Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| | | which is a continuation-in-part of: |

-continued

| application Ser. No. | Date Filed | Title |
|---|---|---|
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION |
| | | which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY |
| | | which is a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION |
| | | which is a continuation-in-part of: |
| 15/091,563 U.S Pat. No. 10,204,147 | Apr. 5, 2016 Issue Date Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES |
| | | and is also a continuation-in-part of: |
| 14/986,536 U.S Pat. No. 10,210,255 | Dec. 31, 2015 Issue Date Feb. 19, 2019 | DISTRIBUTED SYSTEM FOR LARGE VOLUME DEEP WEB DATA EXTRACTION |
| | | and is also a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | HIGHLY SCALABLE DISTRIBUTED CONNECTION INTERFACE FOR DATA CAPTURE FROM MULTIPLE NETWORK SERVICE AND CLOUD-BASED SOURCES |
| | | Is a continuation-in-part of: |
| 17/035,029 | Sep. 28, 2020 | SYSTEM AND METHOD FOR CREATION AND IMPLEMENTATION OF DATA PROCESSING WORKFLOWS USING A DISTRIBUTED COMPUTATIONAL GRAPH |
| | | which is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED CYBERSECURITY THREAT MITIGATION USING SOFTWARE SUPPLY CHAIN ANALYSIS |
| | | which is a continuation-in-part of: |
| 16/855,724 | Apr. 22, 2020 | ADVANCED CYBERSECURITY THREAT MITIGATION USING SOFTWARE SUPPLY CHAIN ANALYSIS |
| | | which is a continuation-in-part of: |
| 16/836,717 | Mar. 31, 2020 | HOLISTIC COMPUTER SYSTEM CYBERSECURITY EVALUATION AND SCORING |
| | | which is a continuation-in-part of: |
| 15/887,496 U.S Pat. No. 10,783,241 | Feb. 2, 2018 Issue Date Sep. 22, 2020 | SYSTEM AND METHODS FOR SANDBOXED MALWARE ANALYSIS AND AUTOMATED PATCH DEVELOPMENT, DEPLOYMENT AND VALIDATION |
| | | which is a continuation-in-part of: |
| 15/823,285 U.S Pat. No. 10,740,096 | Nov. 27, 2017 Issue Date Aug. 11, 2020 | META-INDEXING, SEARCH, COMPLIANCE, AND TEST FRAMEWORK FOR SOFTWARE DEVELOPMENT |
| | | which is a continuation-in-part of: |
| 15/788,718 | Oct. 19, 2017 | DATA MONETIZATION AND EXCHANGE PLATFORM |
| | | which claims priority, and benefit to: |
| 62/568,307 | Oct. 4, 2017 | DATA MONETIZATION AND EXCHANGE PLATFORM |
| | | and is also a continuation-in-part of: |
| 15/788,002 | Oct. 19, 2017 | ALGORITHM MONETIZATION AND EXCHANGE PLATFORM |
| | | which claims priority, and benefit to: |

-continued

| application Ser. No. | Date Filed | Title |
|---|---|---|
| 62/568,305 | Oct. 4, 2017 | ALGORITHM MONETIZATION AND EXCHANGE PLATFORM |
| | | and is also a continuation-in-part of: |
| 15/787,601 | Oct. 18, 2017 | METHOD AND APPARATUS FOR CROWDSOURCED DATA GATHERING, EXTRACTION, AND COMPENSATION |
| | | which claims priority, and benefit to: |
| 62/568,312 | Oct. 4, 2017 | METHOD AND APPARATUS FOR CROWDSOURCED DATA GATHERING, EXTRACTION, AND COMPENSATION |
| | | and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | which is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPHY |
| Current application | Herewith | HIGHLY SCALABLE DISTRIBUTED CONNECTION INTERFACE FOR DATA CAPTURE FROM MULTIPLE NETWORK SERVICE AND CLOUD-BASED SOURCES |
| | | Is a continuation-in-part of: |
| 17/035,029 | Sep. 28, 2020 | SYSTEM AND METHOD FOR CREATION AND IMPLEMENTATION OF DATA PROCESSING WORKFLOWS USING A DISTRIBUTED COMPUTATIONAL GRAPH |
| | | which is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/855,724 | Apr. 22, 2020 | ADVANCED CYBERSECURITY THREAT MITIGATION USING SOFTWARE SUPPLY CHAIN ANALYSIS |
| | | which is a continuation-in-part of: |
| 16/777,270 | Jan. 30, 2020 | CYBERSECURITY PROFILING AND RATING USING ACTIVE AND PASSIVE EXTERNAL RECONNAISSANCE |
| | | which is a continuation-in-part of: |
| 16/720,383 | Dec. 19, 2019 | RATING ORGANIZATION CYBERSECURITY USING ACTIVE AND PASSIVE EXTERNAL RECONNAISSANCE |
| | | which is a continuation of: |
| 15/823,363 U.S Pat. No. 10,560,483 | Nov. 27, 2017 Issue Date Feb. 11, 2020 | RATING ORGANIZATION CYBERSECURITY USING ACTIVE AND PASSIVE EXTERNAL RECONNAISSANCE |
| | | which is a continuation-in-part of: |
| 15/725,274 U.S Pat. No. 10,609,079 | Oct. 4, 2017 Issue Date Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT |
| Current application | Herewith | HIGHLY SCALABLE DISTRIBUTED CONNECTION INTERFACE FOR DATA CAPTURE FROM MULTIPLE NETWORK SERVICE AND CLOUD-BASED SOURCES |
| | | Is a continuation-in-part of: |
| 17/035,029 | Sep. 28, 2020 | SYSTEM AND METHOD FOR CREATION AND IMPLEMENTATION OF DATA PROCESSING WORKFLOWS USING A DISTRIBUTED COMPUTATIONAL GRAPH |
| | | which is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |

-continued

| application Ser. No. | Date Filed | Title |
|---|---|---|
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/813,097 | Nov. 14, 2017 | EPISTEMIC UNCERTAINTY REDUCTION USING SIMULATIONS, MODELS AND DATA EXCHANGE |
| | | which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| Current application | Herewith | HIGHLY SCALABLE DISTRIBUTED CONNECTION INTERFACE FOR DATA CAPTURE FROM MULTIPLE NETWORK SERVICE AND CLOUD-BASED SOURCES |
| | | Is a continuation-in-part of: |
| 17/035,029 | Sep. 28, 2020 | SYSTEM AND METHOD FOR CREATION AND IMPLEMENTATION OF DATA PROCESSING WORKFLOWS USING A DISTRIBUTED COMPUTATIONAL GRAPH |
| | | which is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is also a continuation-in-part of: |
| 15/806,697 | Nov. 8, 2017 | MODELING MULTI-PERIL CATASTROPHE USING A DISTRIBUTED SIMULATION ENGINE |
| | | which is a continuation-in-part of: |
| 15/376,657 U.S Pat. No. 10,402,906 | Dec. 13, 2016 Issue Date Sep. 3, 2019 | QUANTIFICATION FOR INVESTMENT VEHICLE MANAGEMENT EMPLOYING AN ADVANCED DECISION PLATFORM |
| | | which is a continuation-in-part of: |
| 15/237,625 U.S Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM |
| Current application | Herewith | HIGHLY SCALABLE DISTRIBUTED CONNECTION INTERFACE FOR DATA CAPTURE FROM MULTIPLE NETWORK SERVICE AND CLOUD-BASED SOURCES |
| | | Is a continuation-in-part of: |

-continued

| application Ser. No. | Date Filed | Title |
|---|---|---|
| 17/035,029 | Sep. 28, 2020 | SYSTEM AND METHOD FOR CREATION AND IMPLEMENTATION OF DATA PROCESSING WORKFLOWS USING A DISTRIBUTED COMPUTATIONAL GRAPH |
| | | which is a continuation-in-part of |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/806,697 | Nov. 8, 2017 | MODELING MULTI-PERIL CATASTROPHE USING A DISTRIBUTED SIMULATION ENGINE |
| | | which is a continuation-in-part of: |
| 15/343,209 | Nov. 4, 2016 | RISK QUANTIFICATION FOR INSURANCE PROCESS MANAGEMENT EMPLOYING AN ADVANCED DECISION PLATFORM |
| | | which is a continuation-in-part of: |
| 15/237,625 U.S Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM |
| | | and is also a continuation-in-part of: |
| 15/229,476 U.S Pat. No. 10,454,791 | Aug. 5, 2016 Issue Date Oct. 22, 2019 | HIGHLY SCALABLE DISTRIBUTED CONNECTION INTERFACE FOR DATA CAPTURE FROM MULTIPLE NETWORK SERVICE SOURCES |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| Current application | Herewith | HIGHLY SCALABLE DISTRIBUTED CONNECTION INTERFACE FOR DATA CAPTURE FROM MULTIPLE NETWORK SERVICE AND CLOUD-BASED SOURCES |
| | | Is a continuation-in-part of: |
| 17/035,029 | Sep. 28, 2020 | SYSTEM AND METHOD FOR CREATION AND IMPLEMENTATION OF DATA PROCESSING WORKFLOWS USING A DISTRIBUTED COMPUTATIONAL GRAPH |
| | | which is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |

-continued

| application Ser. No. | Date Filed | Title |
|---|---|---|
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/673,368 | Aug. 9, 2017 | AUTOMATED SELECTION AND PROCESSING OF FINANCIAL MODELS |
| | | which is a continuation-in-part of: |
| 15/376,657 U.S Pat. No. 10,402,906 | Dec. 13, 2016 Issue Date Sep. 3, 2019 | QUANTIFICATION FOR INVESTMENT VEHICLE MANAGEMENT EMPLOYING AN ADVANCED DECISION PLATFORM |
| Current application | Herewith | HIGHLY SCALABLE DISTRIBUTED CONNECTION INTERFACE FOR DATA CAPTURE FROM MULTIPLE NETWORK SERVICE AND CLOUD-BASED SOURCES |
| | | Is a continuation-in-part of: |
| 17/035,029 | Sep. 28, 2020 | SYSTEM AND METHOD FOR CREATION AND IMPLEMENTATION OF DATA PROCESSING WORKFLOWS USING A DISTRIBUTED COMPUTATIONAL GRAPH |
| | | which is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/849,901 | Dec. 21, 2017 | SYSTEM AND METHOD FOR OPTIMIZATION AND LOAD BALANCING OF COMPUTER CLUSTERS |
| | | which is a continuation-in-part of: |
| 15/835,312 | Dec. 7, 2017 | SYSTEM AND METHODS FOR MULTI-LANGUAGE ABSTRACT MODEL CREATION FOR DIGITAL ENVIRONMENT SIMULATIONS |
| | | which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION |
| Current application | Herewith | HIGHLY SCALABLE DISTRIBUTED CONNECTION INTERFACE FOR DATA CAPTURE FROM MULTIPLE NETWORK SERVICE AND CLOUD-BASED SOURCES |
| | | Is a continuation-in-part of: |
| 17/035,029 | Sep. 28, 2020 | SYSTEM AND METHOD FOR CREATION AND IMPLEMENTATION OF DATA PROCESSING WORKFLOWS USING A DISTRIBUTED COMPUTATIONAL GRAPH |
| | | which is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |

| application Ser. No. | Date Filed | Title |
|---|---|---|
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/849,901 | Dec. 21, 2017 | SYSTEM AND METHOD FOR OPTIMIZATION AND LOAD BALANCING OF COMPUTER CLUSTERS |
| | | which is a continuation-in-part of: |
| 15/835,436 U.S Pat. No. 10,572,828 | Dec. 7, 2017 Issue Date Feb. 25, 2020 | TRANSFER LEARNING AND DOMAIN ADAPTATION USING DISTRIBUTABLE DATA MODELS |
| | | which is a continuation-in-part of: |
| 15/790,457 | Oct. 23, 2017 | DISTRIBUTABLE MODEL WITH BIASES CONTAINED WITHIN DISTRIBUTED DATA |
| | | which claims benefit of, and priority to: |
| 62/568,298 | Oct. 4, 2017 | DISTRIBUTABLE MODEL WITH BIASES CONTAINED IN DISTRIBUTED DATA |
| | | and is also a continuation-in-part of: |
| 15/790,327 | Oct 23, 2017 | DISTRIBUTABLE MODEL WITH DISTRIBUTED DATA |
| | | which claims benefit of, and priority to: |
| 62/568,291 | Oct. 4, 2017 | DISTRIBUTABLE MODEL WITH DISTRIBUTED DATA |
| | | and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | and is also a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION | the entire specification of each of which is incorporated herein by reference.

BACKGROUND OF THE INVENTION

Field of the Invention

The present invention is in the field of use of computer systems, and more specifically, the field of networking of cloud-based computer services.

Discussion of the State of the Art

There has been a great proliferation in the use of cloud-based service companies offering solutions for such business functions as customer relationship management, world event news sourcing, market news sourcing and analysis, infrastructure monitoring, human resource management, business real estate conditions, and government activity information sourcing. These business functions may be accessed through network or cloud-based services which often require communication with a server for specific services or to access a database. This means that implementing an application programming interface (API) is usually the best practice for accessing the services. Unfortunately, APIs can take many different shapes and forms, even though most of them accomplish very similar functions. There are some tools available that make the process of building custom APIs easier, such as server frameworks like HAPI and EXPRESS or ODM/ORMs like MONGOOSE and SEQUELIZE, however even with these tools there is a substantial amount of code involved with setting up even the most basic CRUD API endpoints specific to a project, especially when implementing standard features such as API documentation and validation even when using a standard like SWAGGER. While all these tools, options, and features allow for control over the API, they can become burdensome if not overwhelming, especially for rapid API development, and even more if there is no prior API development experience. A robust connection interface to all network service and cloud-based service sources of business interest must be provided.

Currently, there are a small number of scriptable data capture and sort interfaces such as: Zapier and IFTTT, both able to connect to a number of network data sources.

However, these offerings possess only very lightweight logic options for moving the captured data into specific categories or transformation pathways which greatly limit their usefulness in complex business situations often encountered. Another Open Source capture engine, Sparkta, is focused on streaming aggregation and fails to provide flexibility for routinely supporting event-driven polling in addition to passive stream monitoring of third-party APIs and similar operations needed by a business operating system.

What is needed is a fully integrated system that retrieves business relevant information from many disparate and heterogeneous sources using a scalable, expressively scriptable declarative connection interface and then autonomously configures network service and cloud-based service APIs as well as transforming the data into an API useful format with appropriate context for further processing.

SUMMARY OF THE INVENTION

Accordingly, the inventor has developed and reduced to practice, a system and method for a highly scalable distributed connection interface for data capture from multiple network service sources. The connection interface is designed to enable simple to initiate, performant and highly available input/output from a large plurality of external networked service's and application's application programming interfaces (API) to the modules of an integrated predictive business operating system. To handle the high volume of information exchange, the connection interface is distributed and designed to be scalable and self-load-balancing. The connection interface possesses robust expressive scripting capabilities that allow highly specific handling rules to be generated for the routing, transformation, and output of data within the business operating system. Incoming data may be received by passive stream monitoring, or by event-oriented or time-driven download of network service information to name just two possibilities. Output may be direct tabular display of raw or transformed data, graphical or derived graphical display, such as simulation presentation, either with or without persistence. Data may be persistently stored in any of several data stores for which the connection interface has internal API routines.

According to a preferred embodiment of the invention, a system for highly scalable distributed connection interface for data capture from multiple network service sources implemented in a clustered schema comprising: a computing device comprising a memory, a processor, and a non-volatile data storage device; a component input server comprising a first plurality of programming instructions stored in the memory of, and operating on the processor of, the computing device, wherein the first plurality of programming instructions, when operating on the processor, cause the computing device to: receive a connector workflow configuration from a REST server; retrieve data messages from a data message queue; store retrieved data messages in a cache; send connector workflow configuration to an execution server; send retrieved data messages to any available execution server; receive an acknowledge signal from an execution server; and remove data messages from the cache when the acknowledge signal is received; and an execution server comprising a second plurality of programming instructions stored in the memory of, and operating on the processor of, the computing device, wherein the second plurality of programming instructions, when operating on the processor, cause the computing device to: receive a retrieved data message from the component input server; send an acknowledge signal to the component input server when a data message has been received; receive the connector workflow configuration and use the information to create instances of component plugins to start a connector workflow process; store the state of the connector workflow process; restart connector workflow processes in the event of workflow stoppage using the stored state of the connector workflow process; and send output of completed workflow and current execution state details to a REST server; and a REST server comprising a third plurality of programming instructions stored in the memory of, and operating on the processor of, the computing device, wherein the third plurality of programming instructions, when operating on the processor, cause the computing device to: receive a user-defined connector workflow and its configuration; create an instance of the component input server; start a connector workflow; send the connector workflow configuration to the input server; receive current execution state details from the execution server; receive the output of a connector workflow; and generate a workflow report.

According to another preferred embodiment, a system for highly scalable distributed connection interface for data capture from multiple network service sources implemented in a clustered schema comprising the steps of: receiving a connector workflow configuration from a REST server; retrieving data messages from a data message queue; storing retrieved data messages in a cache; sending connector workflow configuration to an execution server; sending retrieved data messages to any available execution server; receiving an acknowledge signal from an execution server; removing data messages from the cache when the acknowledge signal is received; receiving a retrieved data message from the component input server; sending an acknowledge signal to the component input server when a data message has been received; receiving the connector workflow configuration and using the information to create instances of component plugins to start a connector workflow process; storing the state of the connector workflow process; restarting connector workflow processes in the event of workflow stoppage using the stored state of the connector workflow process; receiving a user-defined connector workflow and its configuration; creating an instance of the component input server; starting a connector workflow; sending the connector workflow configuration to the input server; receiving current execution state details from the execution server; receiving the output of a connector workflow; and generating a workflow report.

According to an aspect of an embodiment, the computing device is comprised of multiple computers forming a distributed system.

According to an aspect of an embodiment, the connector workflow configuration is a data processing workflow configuration generated from a distributed computational graph module.

According to an aspect of an embodiment, the REST server is a RESTful API that facilitates data exchange between and among cloud-based services.

According to an aspect of an embodiment, the output of the connector workflow is used as the input of one or more separate connector workflows, thus facilitating the construction of complex connector workflows from the combination and interconnection of individual connector workflows.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
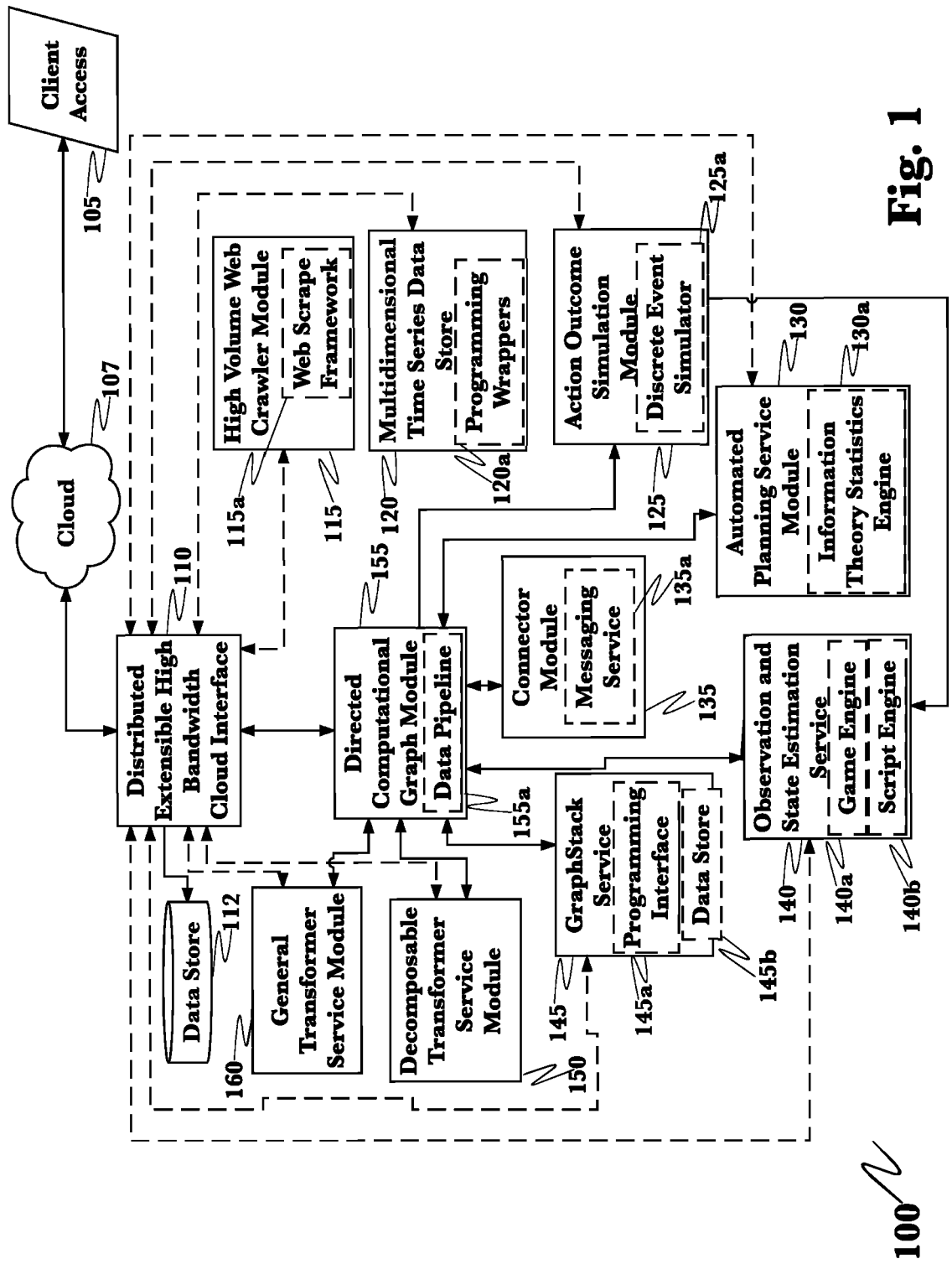
FIG. 1 is a diagram of an exemplary architecture of a business operating system according to an embodiment of the invention.

Accordingly, the inventor has developed and reduced to practice a system and method for a highly scalable distributed connection interface for data capture from multiple network service sources. The connection interface is an enterprise service bus that processes connector workflows by managing a cluster of network resources to capture data from and transfer data between and among network service sources. A connector interface using load-balancing clusters is able to provision and distribute multiple execution processes across cluster nodes for the same connector workflow, allowing for horizontal scaling of the connector workflow. Clusters also improve system performance and scalability by providing fault tolerance in the event that of a malfunctioning cluster node. The system may be able to restart a process, using previous cluster core state information that is persisted by the main workflow node achieving idempotence for processing, an important characteristic of distributed fault-tolerant systems. Load-balancing clusters are configurations in which cluster nodes share a computational workload to provide better overall performance. For example, the connector interface cluster may assign different messages to different nodes, so the overall response time will be optimized. Using this approach, how much the connector interface needs to scale is simply driven by business requirements as the connector cluster allows for more precise control of how computing resources are used. The operations of a load-balancing workflows across a cluster as well as scaling the cluster itself are automated using a container orchestration service, for example Kubernetes™ may be selected as the container service, according to an embodiment.

According to an embodiment, the system can be used as a universal data connection interface for network and cloud-based services. For example, if a user has cloud-based accounts at Twitter™, Slack™, and Google™ cloud-based service providers, the user can set up connectors between the accounts using a distributed computational graph such that all of the configuration information from Twitter™, Slack™, and Google™ is shown in a single interface with a common format. The system takes care of retrieving and formatting the data for the user's use, and takes care of reformatting, uploading, and coordination of data among the cloud-based services if the user makes changes. As an example, if the user changes a password in one cloud-based service all the automated tasks relying on that cloud-based service using the old password are halted until the service is reconfigured. The connector service automatically finds and updates the other two cloud-based services' API keys to function with the new password. As another example, consider a connection between the above mentioned cloud-based services that takes Google™ search queries, sends the query data to Twitter™ to find the most ten most retweeted tweets that are related to the search query data, and then posts the ten tweets in a Slack™ channel related to the search query data. If instead, the system user wanted to use the search query data to find the ten most liked tweets that are related to the search query, a simple configuration change would be automatically applied to the cloud-based services and the intermediate transformation steps to ensure that the data is in the correct format.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

"Workflow" or "connector workflow" as used herein means an orchestrated pattern of data processing activities. Connector workflows may comprise a variety of plugins each of which is related to a cloud-based network service. Each plugin can be categorized into one of the three following components, an input stage, a transformation stage, and an output stage. An input component may listen for specific data messages that enter a message queue and then pass the message to the next component. A transformation component changes the format of the data message in some form. These transformations are generally executed as filters that route the data message dependent upon the filter configuration. An output component receives a data message and either stores the message for future use, or executes a function of the cloud-based network service. A connector workflow may be selected from a list of predefined, built in workflows, or it may be custom built and can be composed of an arbitrary number of input stages, transformation stages, and output stages to allow generalizable data exchange and transformation. Furthermore, each workflow may be configured, using predefined or custom built configurations, to perform a variety of data processing tasks to suit a business' needs.

Conceptual Architecture

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive data from a large plurality of sensors that may be of several different types. The multiple dimension time series data store module may also store any time series data encountered by the system such as but not limited to component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 100 has data from them, which no one really studied due to the great volume of columnar figures, so the alternative courses 125, 140 of action are run. The system, based on all available data, predicts that the fouled sensor or pump is unlikely to be the root cause this time due to other available data, and the contractor is dispatched. She finds a small breach in the pipeline. There will be a small cleanup and the pipeline needs to be shut down for repair but multiple tens of millions of dollars have been saved. This is just one example of a great many of the possible use of the business operating system, those knowledgeable in the art will easily formulate more.

Figure 2:
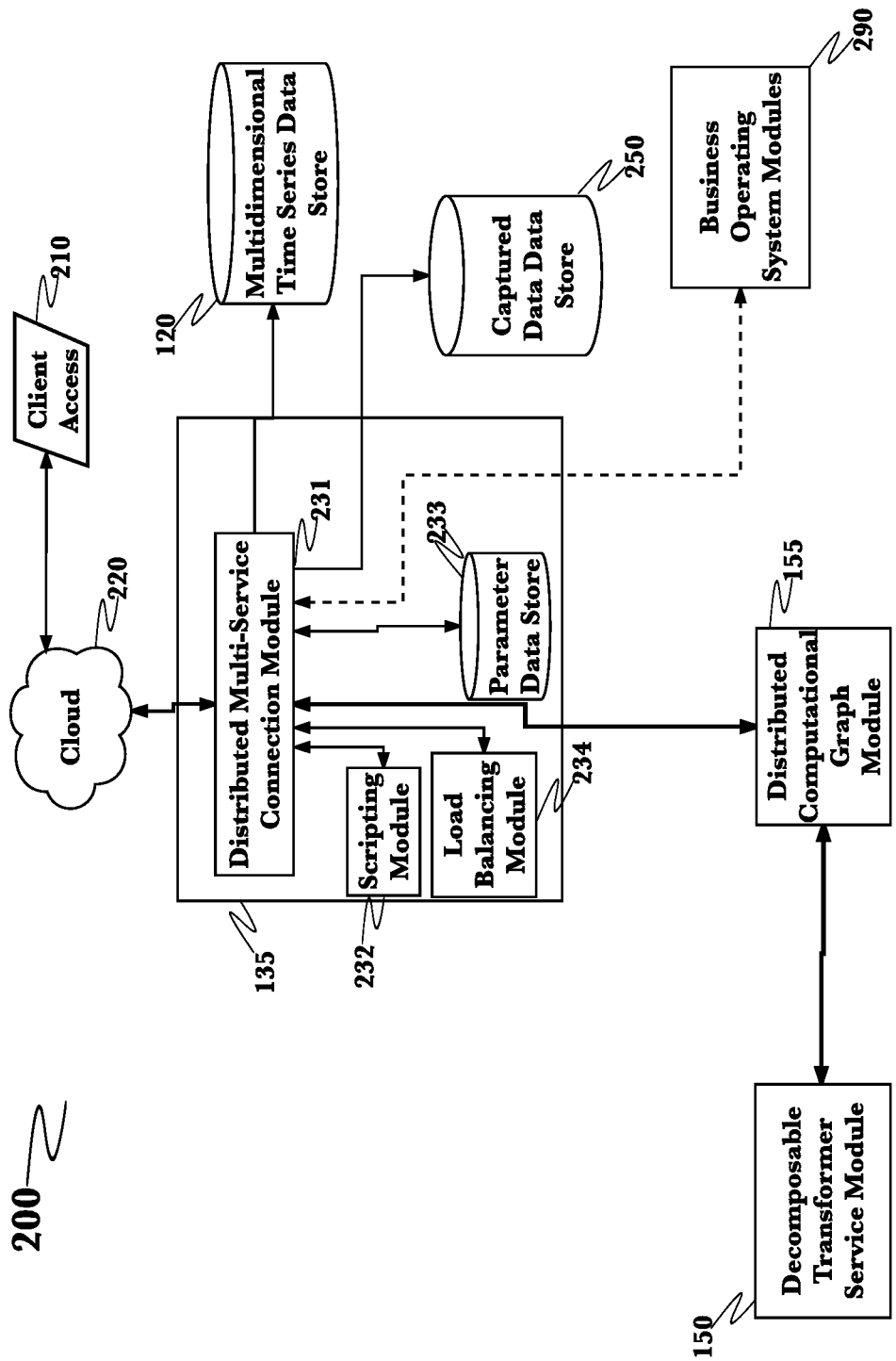
FIG. 2 is a diagram of an exemplary architecture of a connector module and related modules according to an embodiment of the invention.

FIG. 2 is a diagram of an exemplary architecture of a connector module and related modules according to an embodiment of the invention 200. The connector module 135 may be comprised of a distributed multiservice connection module 231 which coordinates connections between the business operating system 100 and external network service sources which may be, for example commercial, cloud based services such as but not limited to SALESFORCE™, BLOOMBERG™, THOMSON-REUTERS™, TWITTER™, FACEBOOK™, and GOOGLE™, while others may be internal network services such as a wireless network health monitor or applications both internal and external that provide output data required by business. The distributed multi-service connection module 231 comprises the API routines that allow it to retrieve either by passive stream monitoring or time or event driven active retrieval depending on the source and the pre-scripted instructions. API routines, analyst generated scripts governing connector module 135 operation, any needed parameters such as security and subscription credentials needed for one or more of the network services, command modifiers, trigger event descriptors, and time period descriptors to list just a few examples may be stored in a parameter data store 233. The inclusion of a robust, expressive scripting language with advanced logic constructs 232 which allows the routing and handling of data within and out of the distributed multi-service connection module sets this connection interface apart from those currently available such as ZAPIER™ and IFTTT™. The ability to retrieve data on event or time dependent bases raises the connector module's 135 abilities above those of SPARKTA™. Of great importance when using connection interface similar to that described here, is that even unexpectedly large influxes of data may be received without loss. To account for these possibilities, the connector module 100 is designed and implemented as a distributed cluster module that is highly and rapidly scalable and the module is self-load balancing capable 234. Information is captured, may have simple transformation done by the API routines but may also have more extensive transformation to convert into forms that are appropriate for the pre-intended use. Much of the data entering the business operating system 100 through the connector module 135 may thus be modified by decomposable transformer service module 150, which is accessed through distributed computational graph module 155. The decomposable transformer service module 150 may be employed in these instances because it is able to perform complex series transformation pathways which may be simple linear, branching, two sources into one output, and reiterative. The nature of transformations done are completely dependent on the intended downstream usage of that data with coding for each transformation pre-programmed and pre-selected for those purposes. Data, raw or transformed, may follow one of a plurality of output pathways as pre-programmed 232 for the data source and type. The data may be directly displayed at a client access terminal 210 which may be remote and network connected 220 or may be directly connected to the system (not shown for simplicity). Time series data, including system logs, performance data, and component logs, among others may be stored persistently in the multidimensional time series data store 120 which is specifically designed and therefore well suited for such data type. Data, raw or transformed may be stored in another data store 250 within the system as per author pre-determination or, the data may be sent to other components of the business system 290, 100, for example the automated planning service module 130 for predictive analytics, the action outcome simulation module 125 for simulation construction or the observation and state estimation service 140 for graphical representation.

Figure 3:
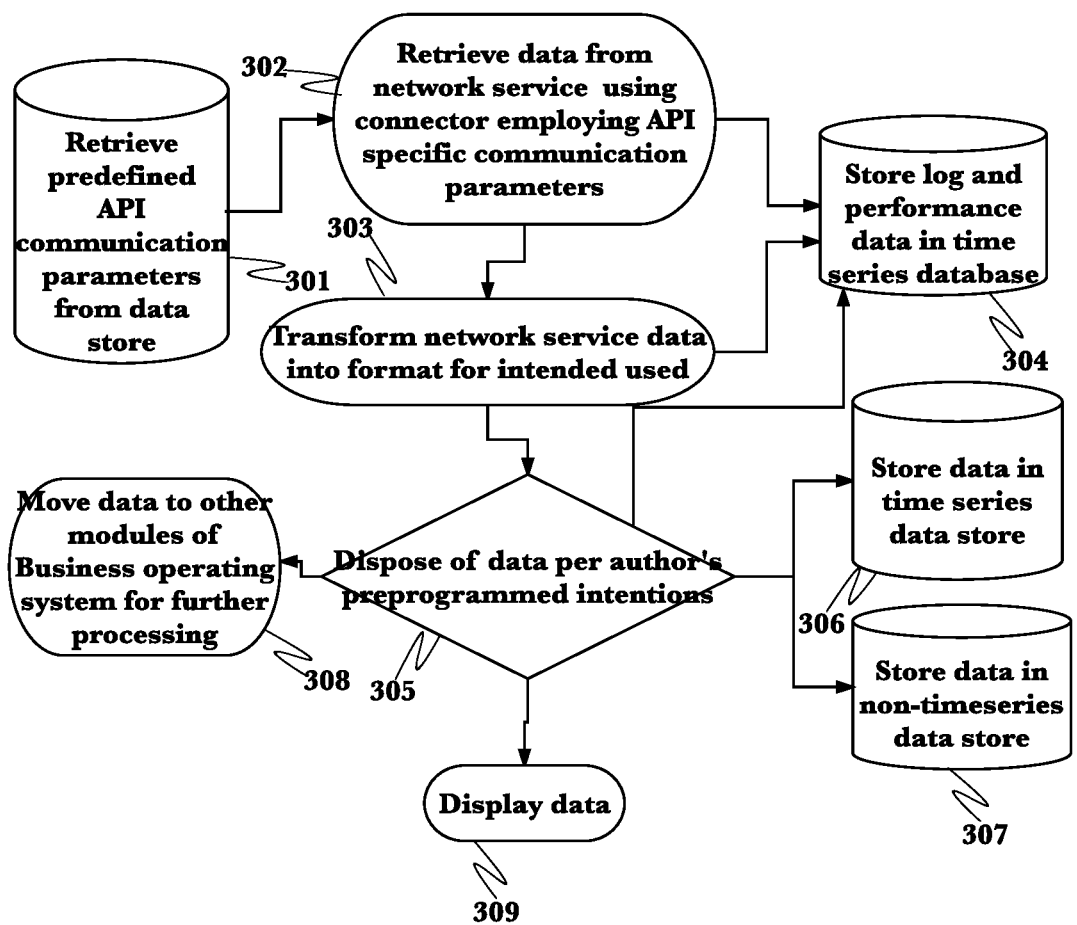
FIG. 3 is a flow diagram of the operation of an exemplary connector module according to an embodiment of the invention.

FIG. 3 is a flow diagram of the operation of an exemplary connector module according to an embodiment of the invention 300. Information from a plurality of network or cloud based service source which may include but are not limited to SALESFORCE™, BLOOMBERG™, THOMSON-REUTERS™, TWITTER™, FACEBOOK™, and GOOGLE™ using a connector module 135 specifically designed for the task 302. The connector module may store and retrieve API routines for the network services from which the desired information is retrieved as well as other parameters such as any security or subscription credentials, among other task related information from one or more databases in a data store 301. Retrieval may occur by passive monitoring of a network service's published data stream as may be the case for sources such as news providers or investment market tickers, to name a few such streaming sources known to those skilled in the art as important to business intelligence and operations through the use of predefined filters. Alternatively, retrieval may occur from a subset of network service sources on the basis of a pre-decided and pre-scripted triggering event of set of triggering events or on a timed interval trigger where the source may be polled for new information either at specific timed intervals or at specific times of the day. Other triggers for information retrieval may be known to those skilled in the art and do to robust, expressive python based scripting language designed into the connector module 135, the invention may be configured to employ any such strategy that can be programmed into a computing device.

Invoking scripts to be employed for specific triggers, time based or event based is simplified by the use of separate parameter files a sample template of which is shown:

```
01    "triggers": [
02        {
03            "uuid": "abscefg",
04            "name": "trigger-name",
05            "type": "time OR event",
06            "condition": [
07                "name": "condition-name",
08                "description": "condition-description",
09                "pythonToEvaluate": "function which returns a boolean when specified input is provided"
10                "pythonToFormatOutputForAction": "function to process available data/state information into action format"
11            ]
12            "action": "123456",
13        }
```

Of special note in the above listing are line 10 where, based upon the trigger, specific formatting may be performed on the incoming data prior to that data being routed to another module in the system 100 for possible further processing or display, and line 12 where the next action to be performed, most likely by another module of the business operating system such as, but not limited to the digital computational graph module 155 and decomposable transformer service module 150 303, the multidimensional time series data store 120, display at a client access terminal 105 or persistent storage in a data store (not shown). Actions brought about by combinations of these and other system modules as also possible. While other business system modules may participate in the processing of information retrieved by the connector module 200, 302, Much of the data modification done 303 may require the transformative capabilities of the decomposable transformer service module 150, which is accessed through distributed computational graph module 155, 400. The decomposable transformer service module 150 may be employed in these instances because it is able to perform complex series transformation pathways which may be simple linear, branching, two sources into one output, and reiterative. The nature of transformations done, for example, aggregation or audio to text translation are completely dependent on the intended downstream usage of that data with coding for each transformation pre-programmed and pre-selected for those purposes. Transformed data may then follow one of several paths to useful disposition which non-exhaustively includes passing the data to other modules of the business operating system 100, 308, displaying the data in tabular of graphical formats 309, or storing the data in a data store most suited to the type of data received 306, 307. Other activities performed by the connector module such as, but not limited to simple data aggregation and output formatting and routing are controlled by the same easily generated and maintained parameter lists and underlying PYTHON™ based scripts as listed above. It should be noted that, while PYTHON™ is currently used as the underlying scripting language, the invention is not reliant upon any specific language to fulfill this purpose and any similar scripting language known to those skilled in the art may be used in its place as utility warrants. Last, each retrieval and processing step, as well as supporting system activities as well as performance data, which may be involved in SLA standards compliance may be stored in the multidimensional time series data store 304, 120 either for metric or analytical monitoring transmission or later inspection during troubleshooting or metric review at a later time.

Figure 4:
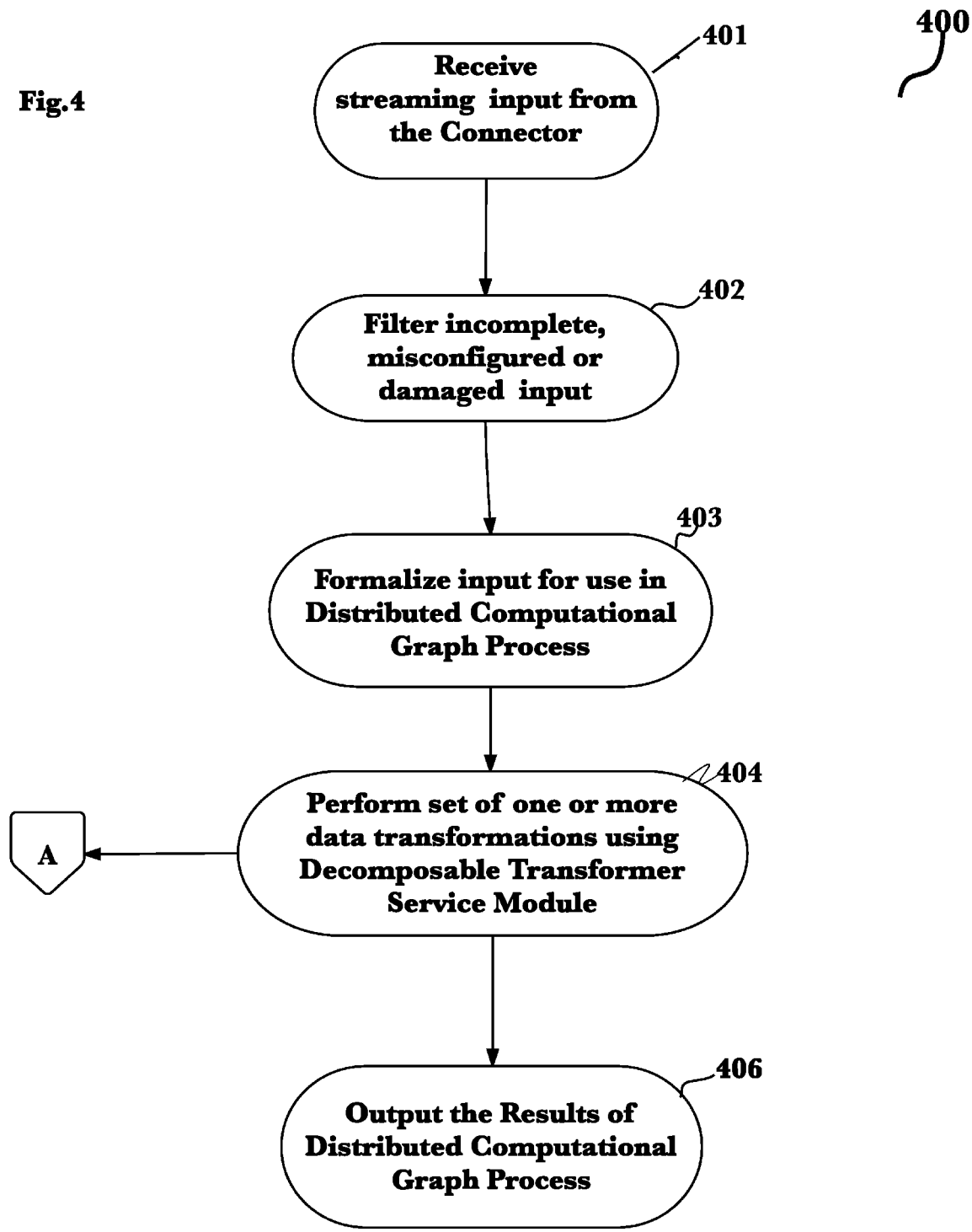
FIG. 4 is a process flow diagram of a method for the receipt, processing and predictive analysis of streaming data using a system of the invention.

FIG. 4 is a process flow diagram of a method 400 for predictive analysis of very large data sets using the decomposable transformation service module. One or more streams of data from a plurality of sources, which includes, but is in no way not limited to, the connector module 135, 200 of the business operating system 100, a number of physical sensors, web based questionnaires and surveys, monitoring of electronic infrastructure, crowd sourcing campaigns, and direct human interaction, may be received by system 401. The received stream is filtered 402 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one substream may be sent for batch processing while another substream may be formalized 403 for transformation pipeline analysis 404. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the embodiment, individual transformations may receive input of expected form from more than one source or receive no input at all as would a transformation acting as a timestamp. According to the embodiment, individual transformations, may not modify the data as would be encountered with a data store acting as a queue for downstream transformations described in ¶064 of co-pending application Ser. No. 14/925, 974. According to the embodiment, individual transformations may provide output to more than one downstream transformation. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to an embodiment, transformations in a transformation pipeline backbone may form a linear, a quasi-linear arrangement. The result of transformation pipeline analysis may then be modified by results from batch analysis of the data stream and output in format predesigned by the authors of the analysis which could be human readable summary printout, human readable instruction printout, human-readable raw printout, data store, or machine encoded information of any format known to the art to be used in further automated analysis or action schema.

Figure 5:
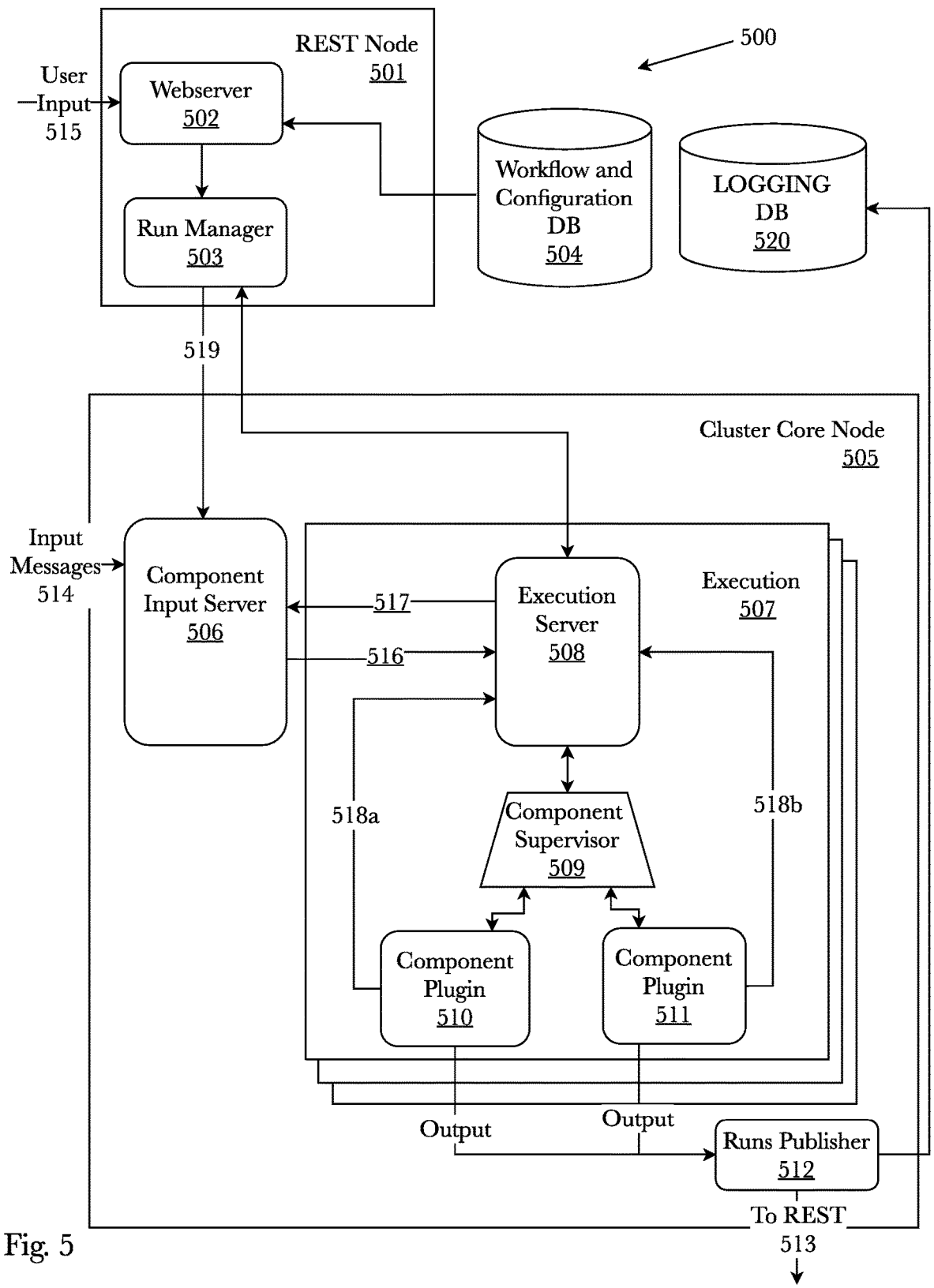
FIG. 5 is a block diagram of an exemplary system architecture for a highly scalable distributed connection interface for data capture from multiple network service sources implementing clustering technique, according to an embodiment.

FIG. 5 is a block diagram of an exemplary system architecture for a highly scalable distributed connection interface 500 for data capture from multiple network service or cloud-based sources implementing clustering technique, according to an embodiment. The implementation of a connector workflow is hereby referred to as a "run." Using a user interface (UI), a connector workflow may be selected from a library of predefined connector workflows, or a custom connector workflow may be easily built and stored into the library for future use. Additionally, each connector workflow may be configured by selecting from a library of common, predefined connector workflow configurations, or a custom configuration may be defined. A data base 504 such as PostgreSQL may be used to store the workflows and configurations. A connector workflow configuration specifies the type of data received by each component and what task that component should perform. For example, a component linked to an email client may be configured to perform send, delete, forward, etc. tasks. A run is started when connector workflow has been selected and configured through user input 515 to a webserver 502 hosted within a representational state transfer (REST) node 501. The REST node 501 functions as the manager of a universal API that connects and integrates various network and cloud-based services. The REST node 501 represents the head node of a clustered network and is responsible for managing all other cluster core nodes 505 to optimize scalability and performance of the connector interface 500. REST node 501 listens to this input and instantiates a run manager 503 in REST node 501 and a component input server 506 in any available cluster core node 505, passing it the user-defined configuration of the connector workflow to be started. At configuration time, the system administratively defines and creates instances of execution servers 508. Each connector workflow may have multiple execution servers 508, and these are dedicated to that particular workflow. The run manager 503 will terminate when the run is stopped by the user input 515 or by a fatal error during execution.

The run manager 503 is instantiated when a connector workflow starts. It is in charge of managing the entire run, and will supervise the input server 506 in cluster core node 505. The run manager 503 may be responsible for a variety of functions including, but not limited to start and restart of workflows by spawning processes (and the required components) dynamically on any core node 505, notify each process, receive notification from a process, and store connector workflow status and components on an in memory database such as Mnesia™. The run manager 503 forwards 519 workflow configuration data to the component input server 506.

According to an embodiment, the input server 506 is responsible for listening for and pulling messages from the queue and creating a new execution 507 to process each message separately and concurrently. A processes pool will handle the number of concurrent tasks or executions 507 being performed at any given time. An execution server 508 will persist the state of the execution 507, and start the component plugin(s) 510, 511 through the component supervisor 509, passing the configuration needed for each plugin 510, 511. It may also store the configuration in case a plugin 510, 511 needs to be restarted.

According to an embodiment, each time a new message 514 arrives to the input server 506 it is cached and also sent to the execution server 508 following a round robin assignment algorithm. The input server 506 is a critical component in a cluster core node 505. Only one input server 506 exists for each connector workflow, and it will take care of the following tasks: creating a predefined amount of execution servers 508 distributed in the different core nodes 505; keeping the configuration of the connector workflow in its state to create and restart the execution servers 508; listening to messages coming from a message queue service such as the advanced message queuing protocol (AMPQ); and passing 516 them to the available execution servers 508. Each new input message 514 received by the input server 506 is cached, then every message is sent to the execution server 506. The sent message is removed from the cache after the input server 506 receives an acknowledge signal 517 from the execution server 508 upon reception of the sent message.

An execution (i.e. workflow process) 507 may consist of an execution server 508 which will help keep the state of the execution 507 (one execution server 508 for each input message), and create the component server supervisor 509, passing the configuration needed for each plugin 510, 511. The execution server 508 is the system component that administrates the output part of the connector workflow. The plugins 510, 511 may be created sequentially as they are needed, and torn down when their job is done. For example, if the workflow consists of three plugins, the first one will be the input, which is always listening for new messages. The second plugin 510, 511 will be created to handle the message and process it, and when the task is done, it will send its output 518a, 518b to the execution server 508 again to create the next plugin and pass the message and so on, until the last plugin finishes and the whole execution 507 is finished. Each plugin 510, 511 is able to communicate with the execution server 508 via the component supervisor 509 and in the event of a plugin failure as communicated by the component supervisor, the execution server 508 will know how to process these errors, while keeping the state of the message which may have had several modifications during the execution 507. This ensures that each plugin is only responsible for handling its own message and does not need to know which following plugin to output it to. Each plugin logs each execution via the runs publisher 512 which persists the execution details to a logging database 520 as well as forwards the execution details to the REST node 513 so that a system user may view the status of each execution 507.

When a connector workflow is stopped normally through user input 515, the system 500 has built in functionality that ensures that messages being processed continue through the workflow. A stop message will go through all the components, preventing them from listening for further messages, and changing their status to "stopping". This status means that the component will not listen for new input, but will complete any pending connector workflow processes. Finally, when everything is done, the components 506, 510, 511 will be killed, and the status of the connector workflow will change to "ready". None of its components 506, 510, 511 will exist anymore until the user starts a new run of the connector workflow again.

Detailed Description of Exemplary Aspects

Figure 6:
FIG. 6 is a diagram illustrating how implementing a load-balancing connector cluster improves system redundancy and performance, according to an embodiment.

FIG. 6 is a diagram illustrating how implementing a load-balancing connector cluster 600 improves system redundancy and performance, according to an embodiment. Load-balancing clusters are configurations in which cluster nodes share computational workload to provide better overall performance. A cluster has a head node that is responsible for managing cluster node processes. The head node for the connector cluster 600 is the REST node 602 that may be accessed by system users 601 to define connector workflow configurations and manages the execution of the connector workflow by assigning workflow component tasks to and among core nodes 603, 604, 605, 606. Each core node maintains a local node cache table supported by a distributed, real-time database management system, for example Mnesia™. The table is used to cache messages required to start the nest stage, and is stored until the next stage is complete. There may be one table per core node, with each table containing instances of input and execution servers for workflows and their status. Node cache tables may contain information such as a node identifier, workflow identifier, current stage (i.e. input, transformation, output), total number of stages within the workflow, number of active stages within workflow, and a variety of metrics for each stage of the execution. Each node sends a replica of its cache table to the REST node 602 which can view the execution status of all core nodes 603, 604, 605, 606. The REST node 602 can use the cache replicas to quickly restart a workflow on any available core node, should a core node fail. Additionally, the REST node 602 assigns 607, 608, 609, 610 a cache replica peer node to each core node 603, 604, 605, 606. Each core node sends a replica of its cache table 611, 612, 613, 614 to the assigned peer which stores the replica in its RAM or disk space. The peer node provides passive storage of data and does not use the replica data during normal operation. In cases where the REST node 602 does not restart a failed core node, the peer node takes over the processing tasks of the failed node by copying the cache replica into its active cache. For example, core node 1 603 is assigned 607 core node 2 604 as its peer node, and subsequently sends a replica 611 of its node cache table to core node 2 604 which maintains its own active cache, as well as passively storing core node 1's 603 cache table replica. In this way, the connector cluster 600 is able to improve both system redundancy and performance by allowing all core nodes 603, 604, 605, 606 to access to other code node caches via the REST node 602 in the event of failure and by allowing the REST node 602 to shift workflows among and between core nodes so they may be executed concurrently, improving system throughput.

Figure 7:
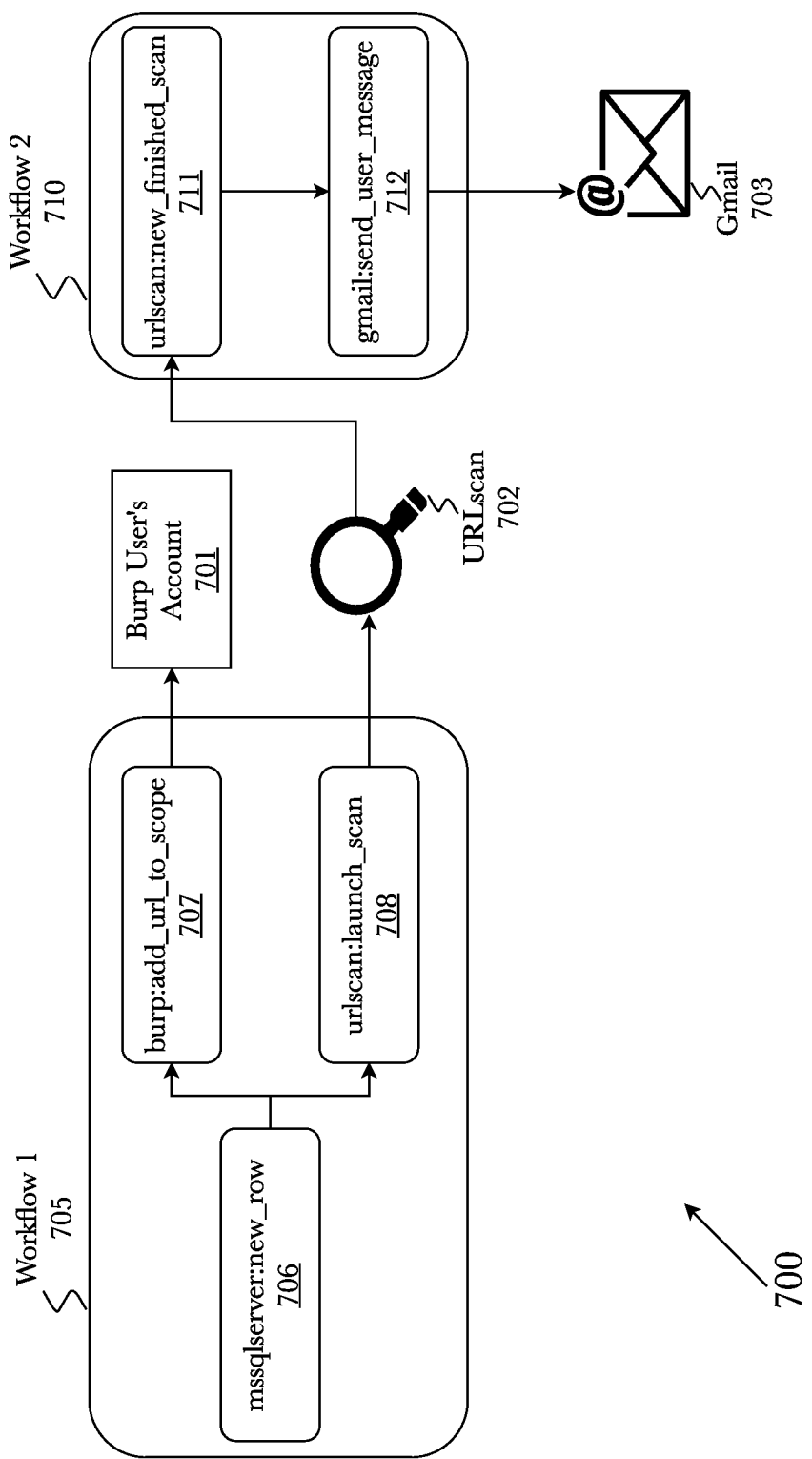
FIG. 7 is block diagram of exemplary connector workflow process for scanning web pages, according to an embodiment.

FIG. 7 is block diagram of exemplary connector workflow process 700 for scanning web pages, according to an embodiment. The connector workflow links data between and among network or cloud-based sources. The process 700 illustrated is a simple example of connector workflow linking data messages from a in network SQL database to multiple cloud-based services such as Burp™, URLscan™, and Gmail™. Each connector workflow 705, 710 may be comprised of an input stage, one or more transformation stages, and an output stage that is most often a network or cloud-based service. Each stage may be configured during workflow construction to perform a specific operation. These operations are declaratively specified using a custom scripting language that facilitates data message exchange between disparate and heterogenous network or cloud-based services. The workflow process 700 of scanning pages can be broken down and performed by two separate workflows 705, 710. Workflow 1 705 looks for new records in a table in a MS SQL server and so the input stage 706 is given the operation function of mssqlserver:new_row, which instructs the input stage to search the MS SQL table row by row for new entries, and uses the URL values stored there to launch new scans using the URLscan 702 could-based service and have the URL value scoped 707 for possible cybersecurity risks using the cloud-based service Burp™ 701. Workflow 2 710 searches for finished scans 711 in URLscan 702 and sends an email 712 to the Gmail application 703, notifying when such finished scan was found and a link to the corresponding report. By splitting the workflow process into two separate workflows, each workflow may be executed simultaneously on different core nodes within the connector cluster 600. This increases system performance by increasing throughput an being able to automatically scale as more input messages are received.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 8:
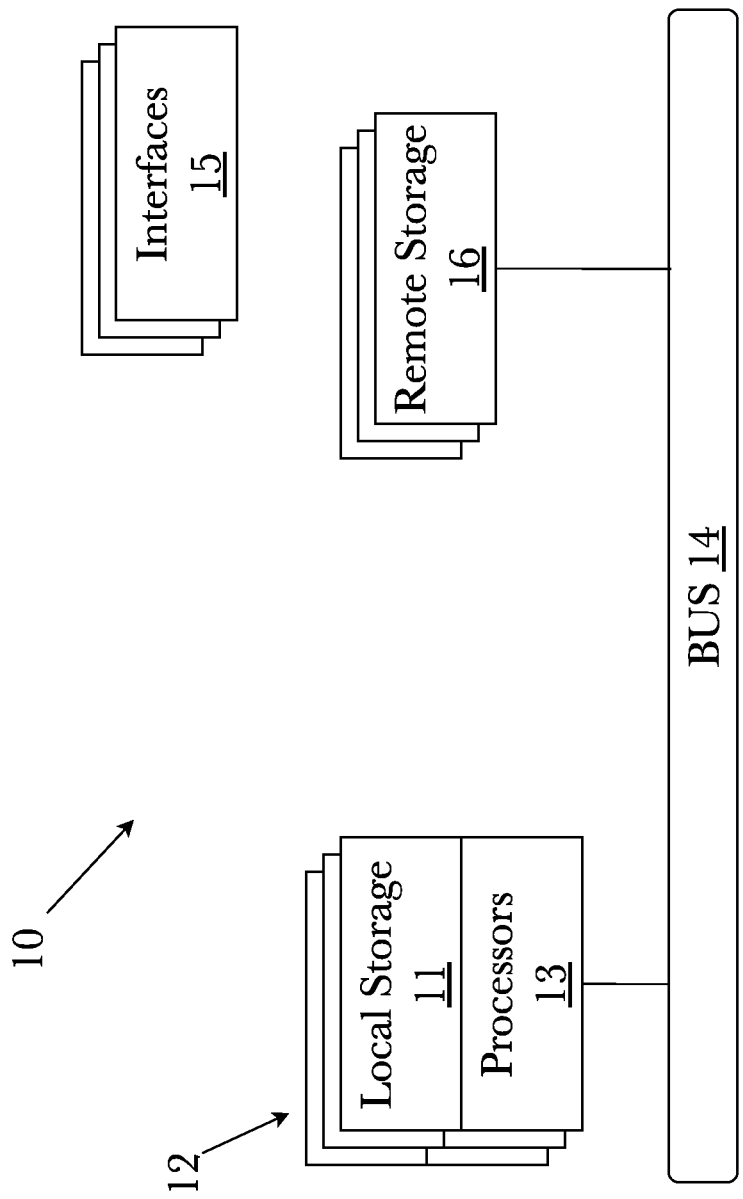
FIG. 8 is a block diagram illustrating an exemplary hardware architecture of a computing device used in various embodiments of the invention.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
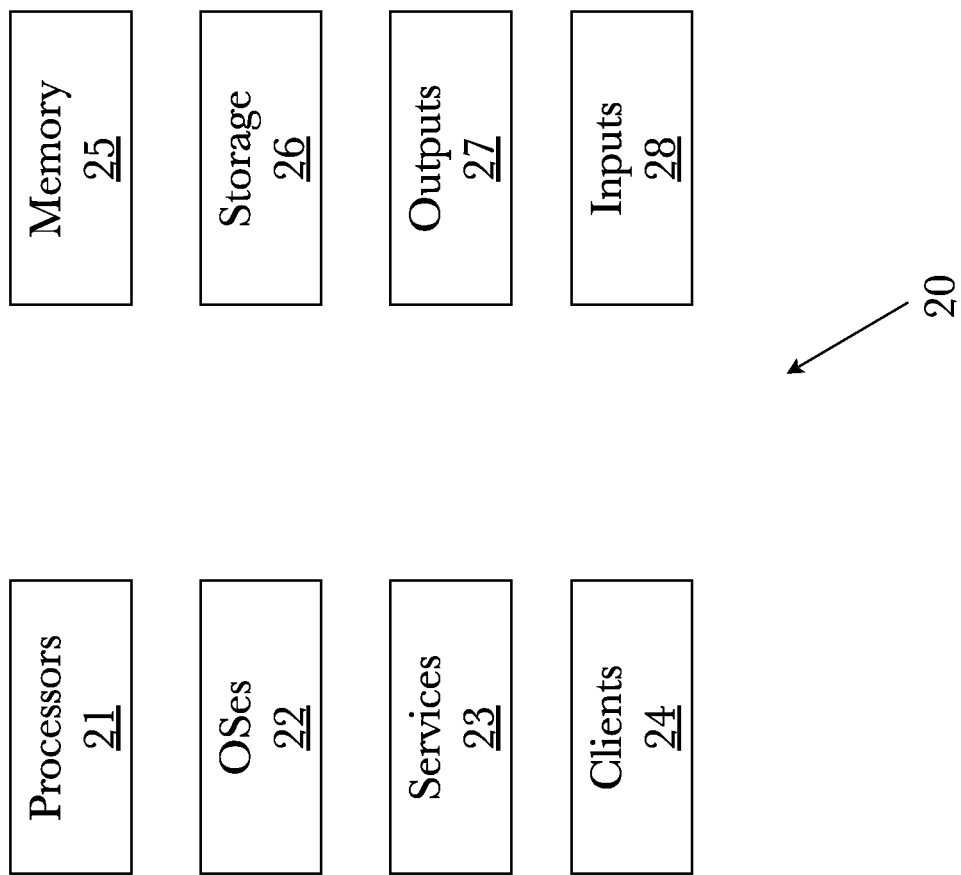
FIG. 9 is a block diagram illustrating an exemplary logical architecture for a client device, according to various embodiments of the invention.

In some embodiments, systems according to the present invention may be implemented on a standalone computing system. Referring now to FIG. 9, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 10:
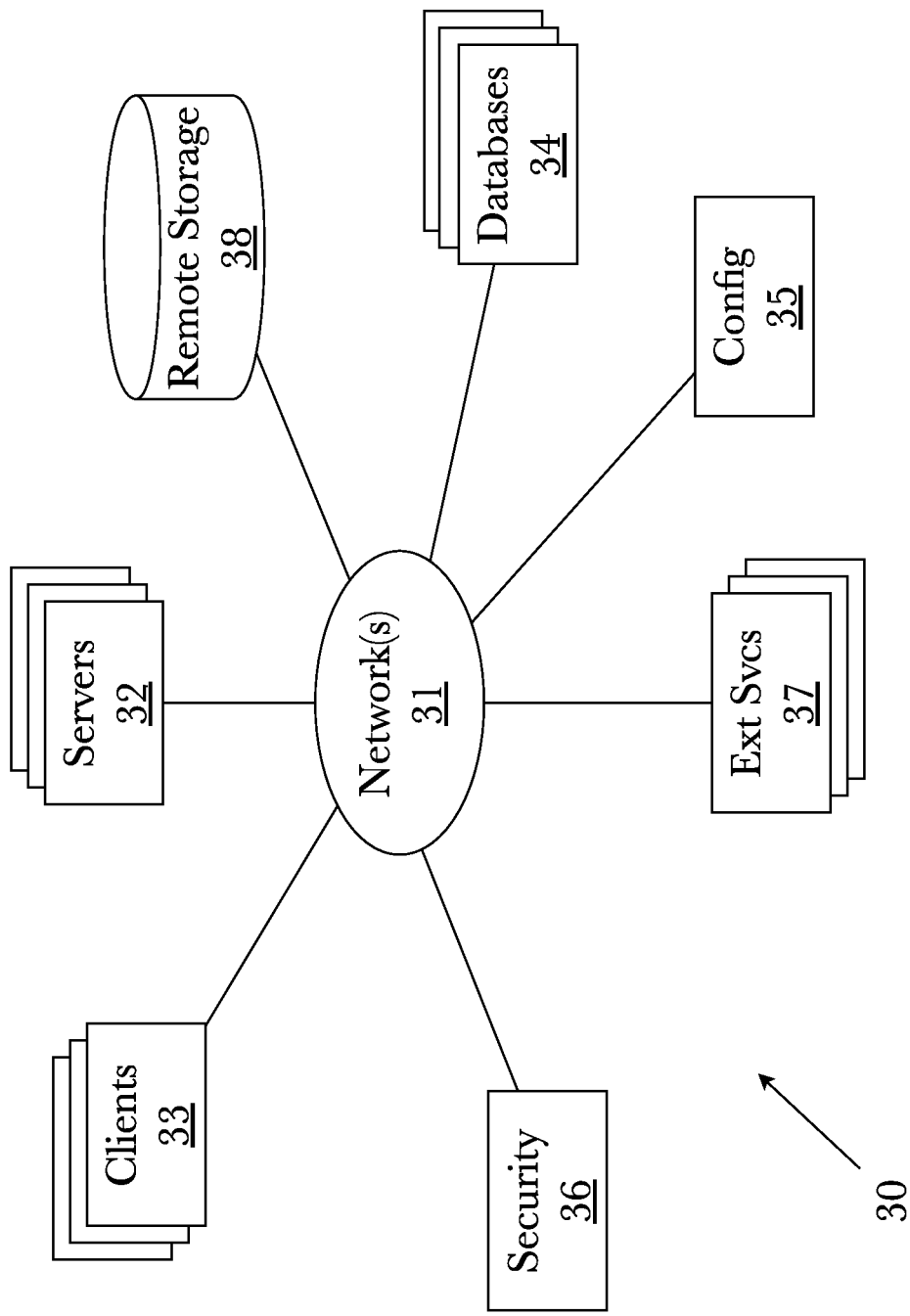
FIG. 10 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 10, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 11:
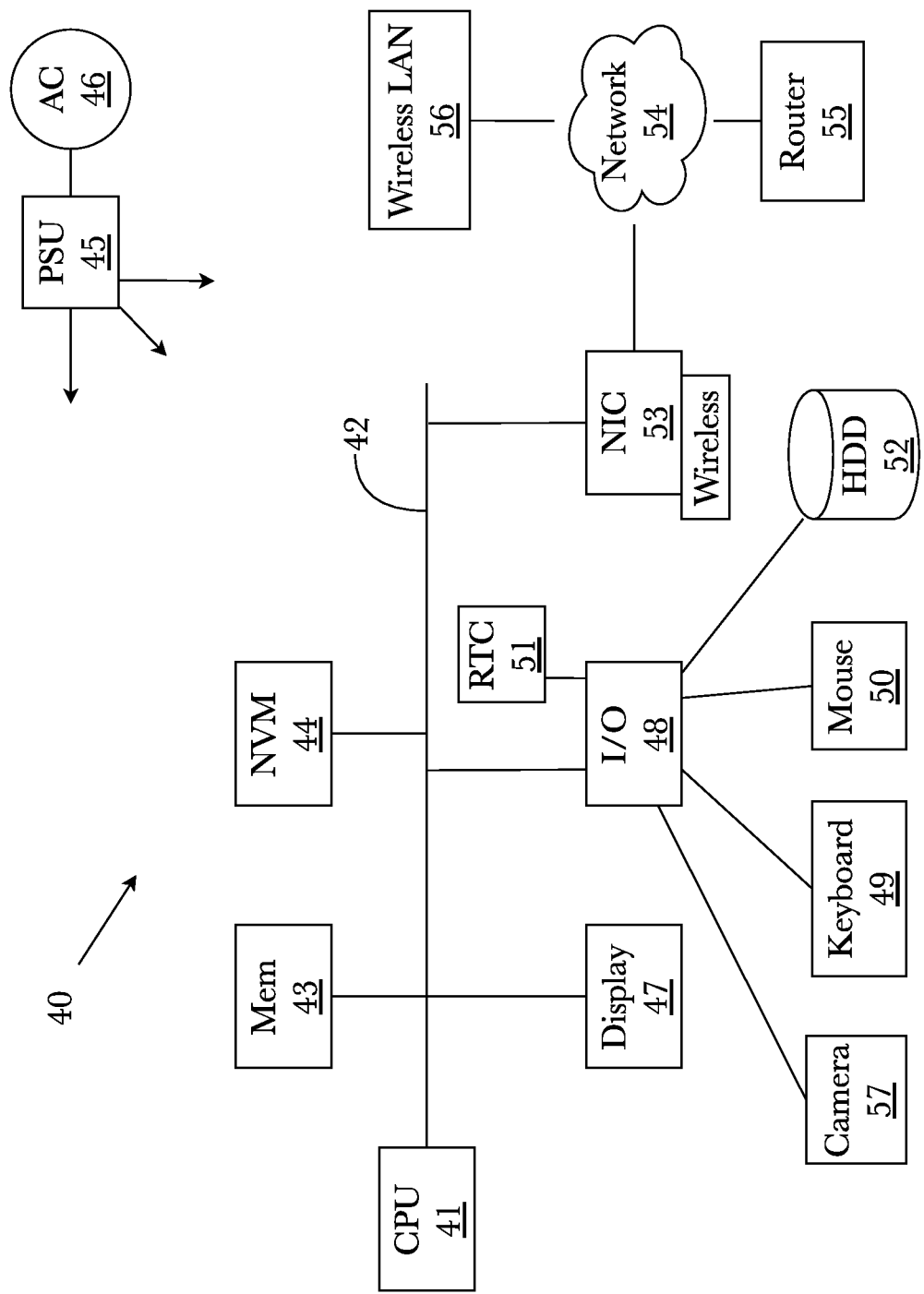
FIG. 11 is another block diagram illustrating an exemplary hardware architecture of a computing device used in various embodiments of the invention.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system for highly scalable distributed connection interface for data capture from cloud-based service sources implemented in a clustered schema comprising:
a computing device comprising a memory, a processor, and a non-volatile data storage device;
a component input server comprising a first plurality of programming instructions stored in the memory of, and operating on the processor of, the computing device, wherein the first plurality of programming instructions, when operating on the processor, cause the computing device to:
receive a connector workflow configuration from a representational state transfer (REST) server;
retrieve a plurality of data messages from a data message queue;
store the plurality of retrieved data messages in a cache;
send the connector workflow configuration to an execution server;
send a first data message of the plurality of data messages to any available execution server;
receive an acknowledgement signal from the execution server; and
remove the first data message from the cache when the acknowledge signal is received;
the execution server comprising a second plurality of programming instructions stored in the memory of, and operating on the processor of, the computing device, wherein the second plurality of programming instructions, when operating on the processor, cause the computing device to:
receive the first data message from the component input server;
send the acknowledge signal to the component input server when a the first data message has been received;
create instances of component plugins to start a connector workflow process based on the connector workflow configuration;
store a state of the connector workflow process;
restart a connector workflow process in the event of workflow stoppage using the stored state of the connector workflow process; and
send an output of the connector workflow process when completed and the stored state of the connector workflow process to a the REST server; and
the REST server comprising a third plurality of programming instructions stored in the memory of, and operating on the processor of, the computing device, wherein the third plurality of programming instructions, when operating on the processor, cause the computing device to:
receive the connector workflow configuration;
instantiate the component input server;
start the connector workflow process;
send the connector workflow process to the component input server;
receive the stored state details from the execution server;
receive the output of the connector workflow; and
generate a workflow report from the output.

2. The system of claim 1, wherein the computing device is comprised of multiple computers forming a distributed system.

3. The system of claim 1, wherein the connector workflow configuration is a data processing workflow generated from a distributed computational graph module.

4. The system of claim 1, wherein the REST server is a RESTful application programming interface (API) that facilitates data exchange between and among cloud-based services.

5. The system of claim 1, wherein the output of the connector workflow process is used as the input to one or more additional connector workflow processes, thus facilitating the construction of complex connector workflow processes from the combination and interconnection of individual connector workflow processes.

6. A method for highly scalable distributed connection interface for data capture from multiple network service sources implemented in a clustered schema, comprising the steps of:
using a component input server operating on a computing device comprising a memory, a processor, and a non-volatile data storage device to perform the steps of:
receiving a connector workflow configuration from a representational state transfer (REST) server operating on the computing device;
retrieving a plurality of data messages from a data message queue;
storing the plurality of data messages in a cache;
sending a connector workflow configuration to an execution server operating on the computing device;
sending a first data message of the plurality of data messages to any available execution server;
receiving an acknowledge signal from the execution server;
removing the first data message from the cache when the acknowledge signal is received;
using the execution server operating on the computing device to perform the steps of:
receiving the first data message from the component input server;
sending the acknowledge signal to the component input server when a the first data message has been received;
create instances of component plugins to start a connector workflow process based on the connector workflow configuration;
storing a state of the connector workflow process;
restarting the connector workflow process in the event of workflow stoppage using the stored state of the connector workflow process; and
sending an output of the connector workflow process when completed and current execution state details to the REST server; and
using the REST server operating on the computing device to perform the steps of:
receiving the connector workflow configuration;
instantiating the component input server;
starting the connector workflow process;
sending the connector workflow configuration to the component input server;
receiving the stored state of the connector workflow process from the execution server;
receiving the output of a connector workflow; and
generating a workflow report from the output.

7. The method of claim 6, wherein the computing device is comprised of multiple computers forming a distributed system.

8. The method of claim 6, wherein the connector workflow configuration is a data processing workflow generated from a distributed computational graph module.

9. The method of claim 6, wherein the REST server is a RESTful application programming interface (API) that facilitates data exchange between and among cloud-based services.

10. The method of claim 6, wherein the output of the connector workflow process is used as the input to one or more additional connector workflow processes, thus facilitating the construction of complex connector workflow processes from the combination and interconnection of individual connector workflow processes.

* * * * *